United States Patent Office 2,855,075
Patented Oct. 7, 1958

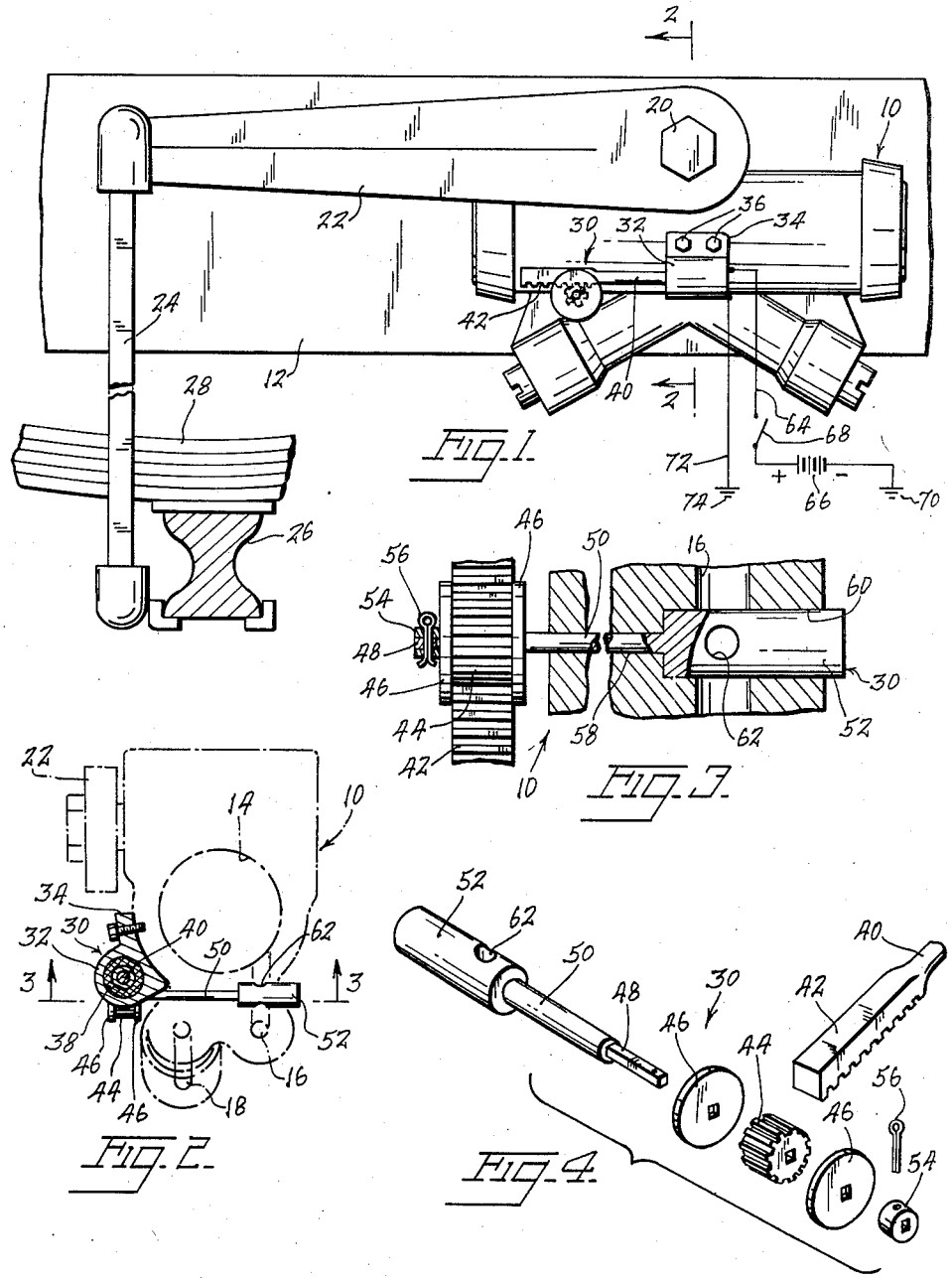

2,855,075

SHOCK ABSORBER WITH ELECTRIC VALVE

Ernest E. Lowber, Staten Island, N. Y.

Application November 8, 1956, Serial No. 621,168

2 Claims. (Cl. 188—87)

Summarized briefly, the present invention is a device for rendering inactive, temporarily, a shock absorber of the type connected between the frame and an axle of a motor vehicle. The invention is a valve device adapted to be located in the passage leading to the rebound compartment of a hydraulically acting shock absorber of otherwise conventional design, adjacent the point at which said passage opens into the rebound cylinder. The valve is normally opened, so as not to interfere with flow of fluid through the passage during normal operation of the shock absorber. However, the invention includes means, which may be either mechanically or electrically operated, for shifting the valve to a closed position. As a result, fluid is trapped in the rebound cylinder and the arm extending from the shock absorber and connected to the axle is thus prevented from swinging downwardly during jacking up of the vehicle wheel.

Bumper jacks are in widespread use today, and one deficiency which has been noted in connection with jacks of this type results from the fact that the jack does not, in actuality, exert a lifting action upon a selective wheel of the vehicle until considerable operation of the jack has taken place, resulting in elevation of the body of the vehicle through a considerable distance before there is an initial movement of the wheel off the ground.

This results from the fact that the frame of the vehicle is the portion of the vehicle to which the lifting action is applied by the bumper jack. This is so because the jack engages the bumper, which is rigidly connected to the frame. The frame, however, does not have a rigid connection to the axle, which must be elevated for the purpose of lifting the wheel off the ground. Rather, there is a spring connection between the frame and the axle, and also connected between the frame and axle is the hydraulic shock absorber.

As the frame begins to rise during initial operation of the bumper jack, the springs by means of which the wheels are suspended from the frame expand, and at the same time, the radius arm extending from the shock absorber begins to swing downwardly. Eventually, after the jack has been operated for a period of time, further expansion of the spring and downward swinging of the shock absorber radius arm is halted, and only now does the wheel begin to lift off the ground.

It will be appreciated that this arrangement is one that results in considerable effort and loss of time so far as the person operating the jack is concerned. Accordingly, the main object of the present invention is to provide means mountable in a shock absorber so designed as to lock the arm of the shock absorber against downward swinging movement, whenever desired. As a result, on operation of a bumper jack, there is, immediately, a rigid connection between the frame and axle. This is due to the fact that the shock absorber arm is locked against downward swinging movement relative to the frame, and is connected by a rod to the axle. Therefore, on initial operation of the bumper jack for the purpose of jacking up a wheel, the frame and axle, and hence the wheel, are elevated conjointly. The elevation of the wheel to the desired extent is thus achieved without more than a minimum amount of effort and loss of time so far as the user is concerned, and further, the extent to which the body of the vehicle must be lifted by the bumper jack is reduced to a marked degree.

Among more specific objects of the invention are to provide a means of the type referred to which can be mountable in a shock absorber with minimum modification of the absorber;

To provide a device as stated wherein the normal, efficient operation of the shock absorber is not interfered with in any respect by the device;

To provide a shock absorber inactivating device capable of manufacture at relatively low cost;

To permit the device to be mounted within shock absorbers of different makes;

To assure efficient operation of the device on all occasions of use thereof; and To permit remotely controlled operation of the device, so that one need not get under the vehicle for the purpose of deactivating the shock absorber.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a side elevational view of the device mounted upon a conventional shock absorber, portions of the vehicle frame and springs being broken away, a wiring connection incorporated in the device being illustrated schematically.

Fig. 2 is a transverse sectional view on line 2—2 of Fig. 1 in which the shock absorber has been shown in dotted lines.

Fig. 3 is an enlarged sectional view on line 3—3 of Fig. 2, portions being broken away and the shock absorber being shown fragmentarily and in full lines.

Fig. 4 is an exploded perspective view of the device per se, portions being broken away.

Referring to the drawings in detail, illustrated in Fig. 1 is a shock absorber 10 of the hydraulic type, mounted in its usual position upon a vehicle frame member 12. The shock absorber, as is usual, includes a rebound cylinder 14, to which extends a rebound passage 16. Shown also is a compression fluid passage 18, which leads to the opposite end of the cylinder.

The shock absorber illustrated is a type known as a double-acting shock absorber with external valves, and hence need not be described in detail, being well known in the art. Such a shock absorber includes pistons at opposite ends of the cylinder, between which pistons there is interposed a cam, not shown, fixedly connected to a stub shaft 20, to which is fixedly secured a radius arm 22 having a connection at its outer end to a depending connecting rod 24 which is in turn connected at its lower end to the axle 26 of the vehicle, said axle being secured to a spring 28.

All this is conventional and does not per se constitute part of the present invention. For the purposes of the present description, it is sufficient to note that during operation of the shock absorber for the purpose of cushioning the vehicle against road shocks, fluid may flow through the rebound passage 16 to and from the rebound cylinder.

In accordance with the present invention, means is provided to at times prevent the flow of fluid through passage 16, thus to trap the fluid in the rebound cylinder to in turn prevent movement of the pistons of the shock absorber. This holds the cam against rotatable movement, locking the arm 22 against downward swinging movement relative to the frame.

The means constituting the present invention has been generally designated at 30, and comprises a valve inserted in the rebound passage 16 and operated in any of various ways. In the illustrated example, the valve is electrically operated, and thus there is provided a solenoid housing 32 having an integral bracket 34 secured by bolts 36 to the wall of the shock absorber cylinder. A solenoid 38 within casing 32 is provided with a core 40, and on the outer, projecting end of the core there is provided a rack 42 having downwardly facing teeth.

The teeth of rack 42 are in mesh with a pinion 44 at opposite sides of which are provided guide washers 46 of a diameter substantially greater than that of the pinion. Square or otherwise noncircular openings are provided in the pinion and washers, receiving the complementarily cross-sectionally shaped axial extension 48 of an elongated rock shaft 50 having at its other end a cylindrical valve plug 52.

Extension 48 is reduced relative to the diameter of the main portion of the rock shaft, thus defining a shoulder and in assembling the device, washers 46 and pinion 44 are positioned upon extension 48 with the inner one of the washers bearing against said shoulder. Then a small sleeve 54 is fitted upon the outer end of extension 48, and has an opening registering with an opening of extension 48 to receive a cotter key 56.

In mounting the device upon a shock absorber, a transverse bore 58 is drilled in the wall of the shock absorber, extending from one side of the shock absorber. At the opposite side, the bore 58 is counterbored as at 60 to receive valve plug 52. Thus, in assembling the device with the shock absorber one would first insert the rock shaft 50 through the counterbore, from the right of Fig. 3. Ultimately, the valve plug will engage against the inner end wall of the counterbore. The extension 48 will now project beyond the opposite side of the shock absorber, and washers 46, pinion 44, and sleeve 54 are mounted upon extension 48 in the manner previously described. Then, rack 42 is placed in mesh with pinion 44 with solenoid housing 32 being mounted upon the shock absorber in the manner previously described.

Formed in plug 52 is a transverse bore 62 which, in one position of the plug, communicates at its opposite ends with the passage 16 to provide for the free flow of fluids through said passage. When the solenoid is energized, rack 42 is retracted, shifting to the right in Fig. 1. This rotates plug 52 ninety degrees to a position in which the bore 62 extends normally to the length of passage 16, closing the passage and trapping fluid in the rebound cylinder. This locks the arm 22 in its raised position and accordingly, when a bumper jack is applied to the vehicle to elevate the frame, the axle 26 will move upwardly with the frame as soon as the frame begins to rise. The wheel of the vehicle is thus lifted immediately, and the frame need not be elevated any more than is absolutely necessary to lift the wheel off the ground.

For the purpose of remotely controlling the operation of the solenoid, there is provided a lead 64 extending from one terminal of the solenoid. Lead 64 extends to one side of a switch 68 which may be mounted upon the instrument panel of the vehicle. From the other terminal of the switch a lead extends to one post of the vehicle battery 66, the other post being connected to the ground at 70. The solenoid, at the other terminal thereof, has a connection 72 to ground 74.

The device can, of course, be mechanically rather than electrically operated and a retractile spring may be operatively connected to the core 40 to normally retain the rack in one position, and within the scope of the appended claims it is proposed that various other types of valves and valve actuating means may be used.

It will be readily seen that with the solenoid in its normally deenergized condition, the shock absorber may operate in its usual way to cushion the vehicle against road shocks. When it is necessary to jack up a wheel of a vehicle, one operates the switch 68 to a closed position energizing the solenoid and causing the valve 52 to move to a passage-closing position to trap fluid in the rebound cylinder, thereby to lock the arm 22 against downward swinging movement, so as to provide in this way a rigid connection between the frame 12 and axle 26.

An important feature of the invention resides in the fact that the plug is held against axial movement with its shaft 50 in one direction, that is to the left in Fig. 3, by engaging the inner end wall of the counterbore 60. Axial movement of the plug and shaft in the opposite direction is prevented by the fact that the rack 42 is itself held against lateral deviation by the solenoid and the solenoid housing, and fits snugly between the washers 46, the outer one of the washers 46 being effective to prevent said axial movement of the plug to the right in Fig. 3 by its engagement against the adjacent side wall of the rack.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. The combination, with a hydraulic shock absorber having a rebound cylinder and a passage leading thereto, of a shock absorber inactivating device comprising a valve in said passage operable between a normal, inoperative position permitting flow of fluid through the passage and an operative, flow-preventing position for trapping fluid in the rebound cylinder, and means for operating the valve between said positions thereof, said valve including a cylindrical plug having a transverse bore registering with said passage in the normal position of the valve and extending perpendicularly to the passage to prevent flow therethrough in said operative valve position, said valve further including a rock shaft rigid with and extending from one end of the plug, for rotating the plug, the shock absorber having a transverse bore in which said rock shaft is rotatable, said transverse bore of the shock absorber being counterbored to receive the plug, the inner end wall of the counterbore defining a shoulder engaging said end of the plug to hold the plug and shaft against axial movement in one direction, the rock shaft, at the end thereof remote from the plug, having an extension, said means for operating the valve including a pinion secured to said extension and a rack in mesh with the pinion, said means further including a solenoid having an axially shiftable core, said rack being rigid with said core, the rack shifting in a direction to operate the valve to its operative position on energizing of the solenoid and being normally disposed, when the solenoid is deenergized, in a position effective to locate the valve inoperatively, said means for operating the valve further including a housing secured to the shock absorber, said solenoid being mounted within the housing with the core and rack projecting out of the housing, said means for operating the valve further including a washer mounted upon said extension adjacent the pinion, said washer being of a diameter substantially greater than the pinion so as to bear against the rack, the washer holding the shaft and plug against axial movement in the opposite direction.

2. The combination, with a hydraulic shock absorber having a rebound cylinder and a passage leading thereto, of a shock absorber inactivating device comprising a valve in said passage operable between a normal, inoperative position permitting flow of fluid through the passage and an operative, flow-preventing position for trapping fluid in the rebound cylinder, and means for operating the valve between said positions thereof, said valve including a cylindrical plug having a transverse bore registering with said passage in the normal position of the valve and extending perpendicularly to the passage to prevent flow therethrough in said operative valve position, said valve further including a rock shaft rigid with and extending from one end of the plug, for rotating the plug, the shock absorber having a transverse bore in which said rock shaft is rotatable, said transverse bore of the shock absorber being counterbored to receive the plug, the inner end wall of the counterbore defining a shoulder engaging said end of the plug to hold the plug and shaft against axial movement in one direction, the rock shaft, at the end thereof remote from the plug, having an extension, said means for operating the valve including a pinion secured to said extension and a rack in mesh with the pinion, said means further including a solenoid having an axially shiftable core, said rack being rigid with said core, the rack shifting in a direction to operate the valve to its operative position on energizing of the solenoid and being normally disposed, when the solenoid is deenergized, in a position effective to locate the valve inoperatively, said means for operating the valve further including a housing secured to the shock absorber, said solenoid being mounted within the housing with the core and rack projecting out of the housing, said means for operating the valve further including a washer mounted upon said extension adjacent the pinion, said washer being of a diameter substantially greater than the pinion so as to bear against the rack, the washer holding the shaft and plug against axial movement in the opposite direction, said washer and pinion being removably mounted upon the shaft, whereby to assemble the washer, rock shaft, and pinion by insertion of the shaft and plug through the transverse bore and counterbore of the shock absorber and by mounting of the washer and pinion upon the shaft following insertion thereof through the shock absorber bore and counterbore.

References Cited in the file of this patent

UNITED STATES PATENTS

| | | |
|---|---|---|
| 802,946 | Waterman | Oct. 24, 1905 |
| 2,182,272 | Armstrong | Dec. 5, 1939 |
| 2,577,391 | Williams | Dec. 4, 1951 |

FOREIGN PATENTS

| | | |
|---|---|---|
| 18,931 | Germany | 1882 |
| 664,770 | Great Britain | Jan. 9, 1952 |
| 462,424 | Italy | Mar. 17, 1951 |